United States Patent
Wu et al.

(10) Patent No.: US 11,770,073 B2
(45) Date of Patent: Sep. 26, 2023

(54) METHODS AND APPARATUS FOR REGULATED HYBRID CONVERTERS

(71) Applicant: Texas Instruments Incorporated, Dallas, TX (US)

(72) Inventors: Wnenkai Wu, East Greenwich, RI (US); Shishuo Zhao, East Greenwich, RI (US); Weidong Zhu, East Lyme, CT (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 525 days.

(21) Appl. No.: 16/396,210

(22) Filed: Apr. 26, 2019

(65) Prior Publication Data

US 2020/0343816 A1 Oct. 29, 2020

(51) Int. Cl.
| | |
|---|---|
| *H02M 3/158* | (2006.01) |
| *H02M 1/08* | (2006.01) |
| *G06F 1/32* | (2019.01) |
| *H02J 9/06* | (2006.01) |
| *H02M 1/00* | (2006.01) |
| *H02M 1/32* | (2007.01) |

(52) U.S. Cl.
CPC ........... *H02M 3/1584* (2013.01); *G06F 1/32* (2013.01); *H02J 9/061* (2013.01); *H02M 1/083* (2013.01); *H02M 1/0058* (2021.05); *H02M 3/1586* (2021.05)

(58) Field of Classification Search
CPC .......... H02M 1/007; H02M 1/32; H02M 1/36; H02M 3/158; H02M 7/487; H02M 7/537; H02M 7/48; H02M 7/53871; H02M 1/008; H02M 3/155; H02M 3/335
See application file for complete search history.

(56) References Cited

U.S. PATENT DOCUMENTS

| | | | |
|---|---|---|---|
| 7,298,197 B2 * | 11/2007 | Duerbaum | H02J 1/102 307/82 |
| 8,067,925 B2 | 11/2011 | Grimm | |
| 9,318,952 B2 | 4/2016 | Oraw et al. | |
| 9,548,668 B2 | 1/2017 | Fu | |
| 2004/0000894 A1 * | 1/2004 | Zhang | H02M 3/1588 323/225 |

(Continued)

OTHER PUBLICATIONS

Author:Chen Xin, Date: Jul. 2, 2018, Publisher: Jan. 10, 2020 p. 27; title: Power Conversion System and Method for Pre-Charging DC-Bus Capacitors Therein (Year: 2018).*

(Continued)

*Primary Examiner* — Wei (Victor) Y Chan
(74) *Attorney, Agent, or Firm* — Ray A. King; Frank D. Cimino

(57) ABSTRACT

Methods, apparatus, systems, and articles of manufacture are disclosed for regulated hybrid converters. An example apparatus includes an input terminal; an output terminal, a first converter circuit coupled between the input terminal and an intermediate node, the first converter circuit having a first switch node, a second converter circuit coupled between the intermediate node and the output terminal, the second converter circuit having a second switch node; a first inductor coupled between the first switch node and the second switch node, and a second inductor coupled between the second switch node and the output terminal.

15 Claims, 8 Drawing Sheets

(56) References Cited

U.S. PATENT DOCUMENTS

| | | | |
|---|---|---|---|
| 2005/0110472 A1* | 5/2005 | Harris | H02M 3/1584 323/271 |
| 2008/0252145 A1* | 10/2008 | Urakabe | H02M 3/33569 307/75 |
| 2009/0261793 A1* | 10/2009 | Urakabe | H02J 7/0016 323/282 |
| 2010/0019753 A1* | 1/2010 | Ikeda | H02M 3/158 323/311 |
| 2013/0020951 A1* | 1/2013 | Pollock | H05B 45/375 315/186 |
| 2016/0126837 A1* | 5/2016 | Tschirhart | H02M 3/1584 323/271 |
| 2017/0085183 A1 | 3/2017 | Notsch | |
| 2020/0006970 A1* | 1/2020 | Chen | H02M 7/217 |

OTHER PUBLICATIONS

Author:Chen Xin, Date: Jul. 2, 2018, Publisher: Jan. 10, 2020 p. 27 (Translation), title: Power Conversion System and Method for Pre-Charging DC-Bus Capacitors Therein (Year: 2018).*

International Search Report dated Jul. 16, 2020, PCT Application No. PCT/US2020/030020, 2 pages.

Written Opinion dated Jul. 16, 2020, PCT Application No. PCT/US2020/030020, 5 pages.

* cited by examiner

METHODS AND APPARATUS FOR REGULATED HYBRID CONVERTERS

FIELD OF THE DISCLOSURE

This disclosure relates generally to power converters and, more particularly, to methods and apparatus for regulated hybrid converters.

BACKGROUND

A power converter, such as a switched mode power supply (SMPS), converts an input voltage to a regulated output voltage, controls switching transistors to transfer input power through energy storage elements (for example, an inductor and/or capacitor) to a load, and supplies load current at the regulated output voltage. An SMPS regulator includes a controller that drives one or more switching transistors coupled at a switching node to the energy storage element(s). In a common configuration, an SMPS regulator (such as buck, boost, buck-boost) includes a power converter/switcher (controller and switching transistor(s)) coupled to an inductor at a switch node. The switched node is switched to supply inductor current to the load and to an output capacitor in parallel with the load, switched between charge/discharge cycles to maintain the regulated output voltage and to supply load current.

Figure 1:
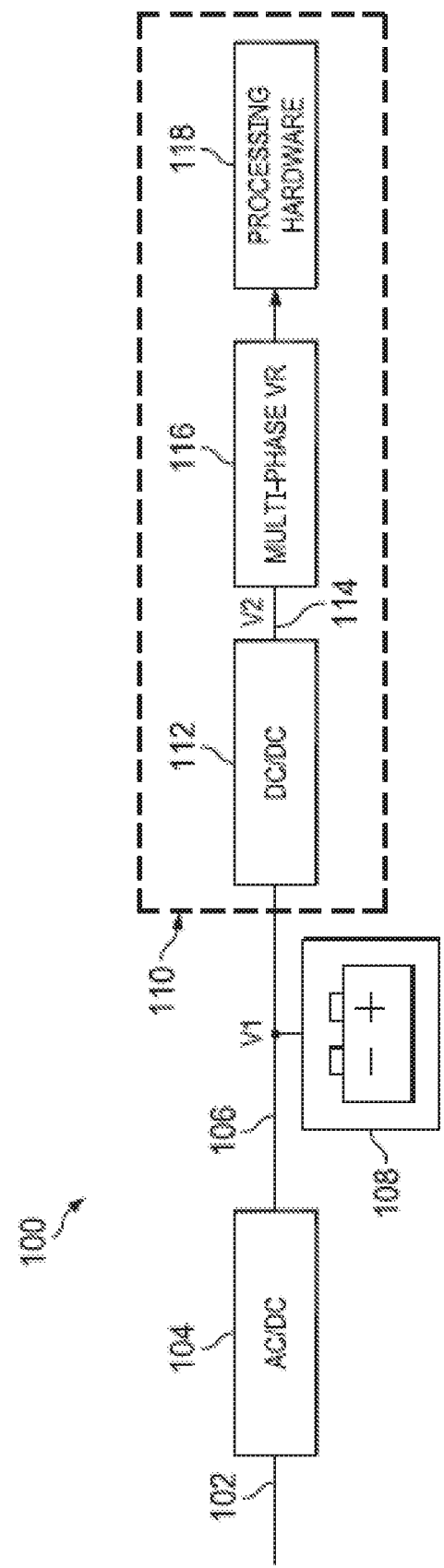
FIG. 1 is a block diagram of an example power-center apparatus to provide power to processing hardware.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Although the figures may show layers and regions with clean lines and boundaries, some or all of these lines and/or boundaries may be idealized. In reality, the boundaries and/or lines may be unobservable, blended, and/or irregular.

DETAILED DESCRIPTION

A power converting circuit typically contains at least one switch, at least one inductor, and at least one capacitor. The switch in a power converting circuit may be a semiconductor device, such as a metal oxide semiconductor field effect transistor (MOSFET), bipolar junction transistor (BJT), diode, etc. The capacitor and inductor are coupled to the switching to provide a smooth and controlled output voltage to a load. A smooth output voltage corresponds to a low ripple current in the inductor and a low ripple voltage in the output. By controlling the current through the inductor, the output voltage can be regulated to a desired value.

Some power converter design examples, the power converter include one or more controllers coupled to a high-side transistor and a low-side transistor. The high-side transistor, when enabled or activated, allows current to flow from supply, or a first phase voltage, through an inductor to an output capacitor, thereby charging the output capacitor and increasing the output voltage. The low-side transistor, when enabled or activated, allows current to flow from the first phase voltage to a second phase voltage, thereby decreasing the output voltage. Power converters switch between high-side control (e.g., enabling the high-side transistor and disabling the low-side transistor to increase the output voltage) and low-side control (e.g., disabling the high-side transistor and enabling the low-side transistor to decrease the output voltage) to provide a substantially stable or otherwise regulated output voltage.

Hard switching can occur in power converters when a high-side transistor or low-side transistor transitions from a blocking state to a conducting state and vice versa. Hard switching results in switching loss which occurs between the time the transistor takes to transition between states wherein the time is a factor of the inability of the transistor to transition between conducting and blocking instantaneously. Examples disclosed herein reduce the energy dissipated when a high-side transistor or a low-side transistor transition from a block state to a conducting state or vice versa by utilizing zero voltage switching.

Zero voltage switching (ZVS) is a switching technique that occurs when a switching transistor drain-to-source voltage falls to zero before the transistor is turned on (conducting state) or off (blocking state), eliminating the instantaneous switching between states. For example, a voltage applied to a gate terminal of the transistor can control the current conducting between a drain terminal and a source terminal. When the switching technique of ZVS is implemented in switching transistor designs, the controller may provide a delayed voltage signal to the gate terminal to wait for the drain and source terminal voltage to drop to zero. Examples disclosed herein describe methods to implement ZVS to one or more switching transistors in a power converting design.

Some power converters have the ability to generate a plurality of voltages corresponding to the plurality of load requirements. In recent years, the number of voltage levels needed for on-board circuits and systems has risen as new generations of processing hardware have been introduced with lower voltage requirements. For example, in addition to designing power converters for the 5 volt and 3.3 volt supplies, there is now a need to design for voltages that range down to 1 volt. Examples disclosed herein optimize intermediate bus voltage (IBV) to achieve high efficiency across an entire voltage range. IBV is the intermediate voltage between the supply voltage and the desired output voltage. For example, if the supply voltage is 54 volts and the desired output voltage is 5 volts, the IBV is a voltage between those two values produced by a power converter.

FIG. 1 is block diagram of an example power-center apparatus 100 to provide sufficient power to a server rack. The power-center apparatus 100 includes a first bus 102 coupled to an example power converter 104. The example power conversion apparatus also includes an example voltage supply 108 coupled to a second bus 106 and an example motherboard 110. In the illustrated example, the first bus 102 and the second bus 106 provide power to the example power converter 104 and the example motherboard 110. In examples disclosed herein, the power-center apparatus 100 provides service or power to a plurality of components, such as processing hardware.

FIG. 1 is provided with the example first bus 102 to provide power to the example power converter 104. The first bus is a voltage bus that connects a power source to one or more other circuits. For example, the first bus 102 supplies line voltage (e.g., 120 VAC) to one or more circuits (e.g., the power converter 104).

FIG. 1 is provided with the example power converter 104 to convert power received by the first bus 102. The example power converter 104 is an AC to DC converter. For example, a first bus 102 may provide alternating current (AC) from a power source and the power converter 104 converts the AC to direct current (DC). In other examples, the power converter 104 could be an AC to AC converter, a DC to DC converter, or any other converter that converts electric energy from one form to another. The converted power is output to an example second bus 106 to provide power to the motherboard 110. The example second bus 106 is a voltage supply that can be coupled to an input terminal, wherein the input terminal supplies input voltage to one or more circuits (e.g., the motherboard 110).

FIG. 1 is provided with an example voltage supply 108 coupled to the second bus 106 at a node V1. The example voltage supply 108 is a 54 volt battery to provide a backup voltage distribution to the example motherboard 110. For example, if the power converter 104 is unable to provide power to the motherboard 110, the voltage supply 108 provides the power to the motherboard 110. Additionally, the example voltage supply 108 may be a power supply, a voltage source, etc.

FIG. 1 is provided with an example motherboard 110 to be the central processing unit of a server rack of the example power-center apparatus 100. For example, the motherboard 110 dictates how many high-speed components a user can install on the server rack, how much storage a memory contains, and the dataflow of the inputs and outputs in a server rack. In examples disclosed herein, the motherboard 110 includes an example DC to DC converter 112 an example third bus 114, an example multi-phase voltage regulator 116, and example processing hardware 118. The motherboard 110 may be hardware coupled to the power-center apparatus 100 via the second bus 106, may be a virtual machine communicatively coupled via wireless data transmission, etc.

FIG. 1 is provided with the example DC to DC converter 112 to convert an input voltage, provided via the second bus 106, to a different output voltage, the output voltage transmitted via the third bus 114. In examples disclosed herein, the DC to DC converter 112 receives a voltage (e.g., 70 volts, 60 volts, 54 volts, etc.) from the power converter 104 and steps down the voltage to an intermediate bus voltage (IBV). In examples disclosed herein, the third bus 114 includes IBV that connects the DC to DC converter 112 with the multi-phase voltage regulator 116 at node V2. The third bus 114 is a voltage supply, different than the voltage supply of the second bus 106 that can be coupled to an output terminal, wherein the output terminal outputs IBV to the example multi-phase voltage regulator 116. Additionally or alternatively, the DC to DC converter 112 can be an AC to DC power converter, an AC to AC power converter, or any other power converter that converts electric energy from one form to another. The DC to DC converter 112 may include a plurality of components to perform the power conversion such as transistors, resistors, inductors, capacitors, etc.

FIG. 1 is provided with the example multi-phase voltage regulator 116 to automatically maintain a constant voltage level in order to provide a desired voltage to the processing hardware 118. The example multi-phase voltage regulator 116 further steps down the IBV received from the DC to DC converter 112 via the third bus 114. As used herein, a multi-phase voltage regulator is a voltage regulator that can achieve power conversion by more than one phase. Additionally or alternatively, the multi-phase voltage regulator 116 can be a linear voltage regulator, a step up voltage regulator, an inverter voltage regulator, etc.

FIG. 1 is provided with the example processing hardware 118 to transform raw data into meaningful information for a computing device. The example processing hardware 118 is coupled to the multi-phase voltage regulator 116 to receive desired voltage to enable the processing of data. In some examples, the processing hardware 118 includes a network card, a sound card, a video card, etc. The example processing hardware 118 elements require a specified amount of power to be delivered for optimal usage. This specification is determined by the elements' internal electrical component power capacity, trace widths, wire gauge, etc.

The example DC to DC converter 112, in connection with the example voltage supply 108 and the example multi-phase voltage regulator 116, reduces power conduction losses that occur when a voltage converter (e.g., DC to DC converter, buck-boost converter, etc.) steps down a high voltage to a lower voltage that is adequate for powering the example processing hardware 118. By reducing power conduction losses, the example power center apparatus 100 operates in an efficient manner relative to a power center that does not include the characteristics described below in connection with FIG. 2 of the example DC to DC converter 112. The example DC to DC converter 112 optimizes the voltage provided to the example processing hardware 118. For example, by optimizing IBV, the example DC to DC converter can provide lower bus voltage for a lighter load (e.g., processing hardware 118 for a telephone) and higher bus voltage for a heavy load (e.g., processing hardware 118 for a television or gaming console).

Figure 2:
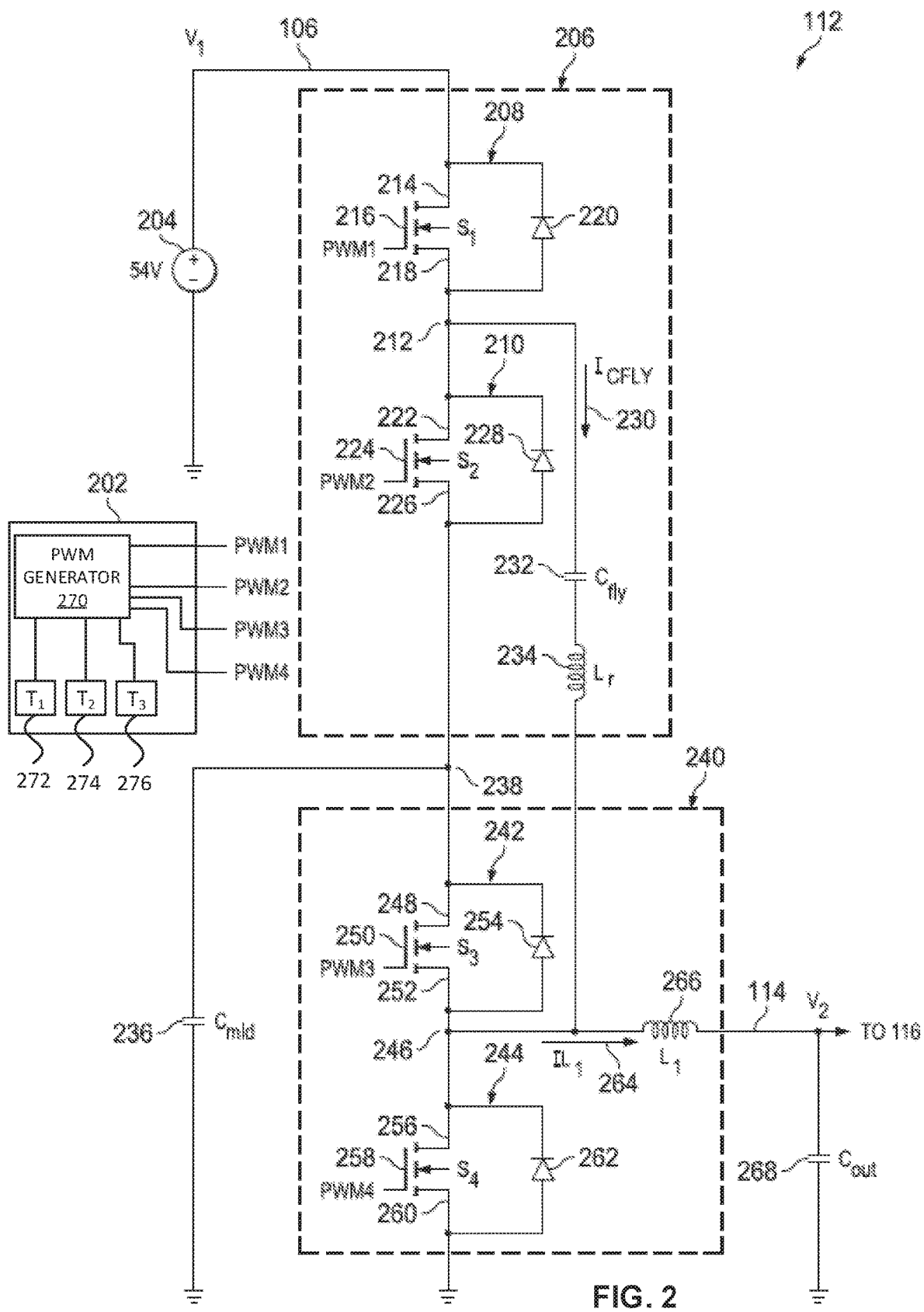
FIG. 2 is schematic illustration of a first example direct current (DC) to DC converter to implement the examples disclosed herein.

FIG. 2 is a schematic including the circuitry that may be used to implement the example DC to DC converter 112 of the example motherboard 110 of the example power-center apparatus 100 in FIG. 1. FIG. 2 includes an example controller 202, an example power supply 204, an example first voltage converter circuit 206, and an example second voltage converter circuit 240. The example power supply 204 is coupled to the example first voltage converter circuit 206 via the second bus 106 and may be the example voltage supply 108 or the voltage delivered by the example power converter 104.

FIG. 2 includes the example controller 202 to control the turn-on and turn-off times of the example transistors in the first and second voltage converter circuits 206, 240. The example controller 202 includes an example PWM generator 270 to generate a pulse-width modulation (PWM) signal and provide it to the switching components of the DC to DC converter 112. In some examples, the PWM signal is a control signal because it controls the current conducting through the transistors. The PWM signal is a turn-on and/or turn-off signal generated to control the operation of the transistors. A PWM signal is injected into a gate terminal of a switching transistor. The PWM signal is an oscillating signal varying in duty cycle. Alternatively, the PWM signal may vary in frequency, therefore noted as a Pulse Frequency Modulated signal (PFM). The PWM and/or PFM signal injected into the gate terminal contains information pertaining to the turn on and/or turn off times of the switching transistor. For example, the PWM generator 270 of the controller 202 may be configured to provide a plurality of PWM signals to the switching transistors, wherein each PWM signal may be the same and turn on switching transistors simultaneously, or they may be different and turn on and off switching transistors in different time intervals. In other examples, the PWM and/or PFM signal injected into the gate terminal may contain information pertaining to the turn on and/or turn off times of any power switch. The PWM generator 270 may be implemented by an integrated circuit (IC) including electrical components to output the control signals, a microcontroller including instructions to generate the control signals, or any other type of hardware or software related system to generate control signals.

In FIG. 2, the example controller 202 includes two example operations wherein the first operation is different than the second operation. The example first operation of the example controller 202 includes generating a first PWM signal (PWM 1) to be synchronous with a third PWM signal (PWM 3) and generating a second PWM signal (PWM 2) to be synchronous with a fourth PWM signal (PWM 4). The example second operation includes generating a PWM 1 at a specified time after PWM 3 and further generating a PWM 2 to be synchronous with PWM 4. For example, the controller 202 includes timer 1 (T1) 272, timer 2 (T2) 274, and timer 3 (T3) 276 coupled to the PWM generator 270 to execute the second operation of the example controller 202. For example, the PWM generator 270 utilizes the timers 272, 274, 276, to determine when to gate (e.g., block) a high signal (e.g., a logic 1, 3 volts, 5 volts, etc.) and when to generate a high signal. The example first operation is described in connection with FIGS. 2 and 3 and the example second operation is described in connection with FIGS. 2 and 7-8.

FIG. 2 is provided with the example first voltage converter circuit 206 which includes an example first transistor 208, or an example first switching transistor 208 and an example second transistor 210, or an example second switching transistor 210, coupled at a first switch node 212, an example first capacitor 232 coupled to the example first switching transistor 208 and the example second switching transistor 210 at the first switch node 212, and an example first inductor (Lr) 234 coupled to the example first capacitor 232.

In FIG. 2, the first switching transistor 208 and the second switching transistor 210 are N-Channel metal oxide semiconductor field effect transistors (MOSFETs). Alternatively, the first and second switching transistors 208, 210 may be P-Channel MOSFETs, PNP BJTs, NPN BJTs, etc. Alternatively, the first switching transistor 208 and the second switching transistor 210 may be a switch or any other type of power switching device. In FIG. 2, the first switching transistor 208 includes a first drain terminal 214, a first gate terminal 216, and a first source terminal 218. In FIG. 2, a first diode 220 is a body diode of the first switching transistor 208. In FIG. 2, the first diode 220 is depicted as being coupled to the first drain terminal 214 and the first source terminal 218 to represent the body diode of the first switching transistor 208.

In FIG. 2, the first switching transistor 208 is a first N-Channel MOSFET (NMOS). The example first switching transistor 208 is an electronic switch which operates (i.e., conducts) when the incoming PWM signal is high. The example first switching transistor 208 can enter a triode operation mode when PWM 1 302 is applied to the first gate terminal 216 that is greater than a source voltage at the first source terminal 218. In the triode operation mode, the first switching transistor 208 acts like a short circuit where current flows from the first drain terminal 214 to the first source terminal 218. The first switching transistor 208 can enter a cut-off operation mode when PWM 1 302 is removed from the first gate terminal 216 so that the gate voltage at the first gate terminal 216 is less than the source voltage at the first source terminal 218.

In FIG. 2, the second switching transistor 210 includes a second drain terminal 222, a second gate terminal 224, and a second source terminal 226. In FIG. 2, a second diode 228 is a body diode of the second switching transistor 210. In FIG. 2, the second diode 228 is depicted as being coupled to the second drain terminal 222 and the second source terminal 226 to represent the body diode of the second switching transistor 210. In operation, the first diode 220 and the second diode 228 operate as suppressor diodes (e.g., flyback diodes, kickback diodes, snubber diodes, etc.). The diodes 220, 228 of FIG. 2 are used to eliminate and/or otherwise suppress flyback, or the sudden voltage spike seen across an inductive load of the controller 202 in between power switching operations of the first and second switching transistors 208, 210.

The second switching transistor 210 of FIG. 2 is a second NMOS. The second NMOS 210 is an electronic switch which operates (i.e., conducts) when the incoming PWM signal is high. The second switching transistor 210 can enter a triode operation mode when a second PWM signal is applied to the second gate terminal 224 that is greater than the source voltage at the second source terminal 226. In the triode operation mode, the second switching transistor 210 acts like a short circuit where current flows from the second drain terminal 222 to the second source terminal 226. The second switching transistor 210 can enter a cut-off operation mode when PWM 2 is removed from the second gate terminal 224 so that the gate voltage at the second gate terminal 224 is less than the source voltage at the second source terminal 226.

In some examples, a power switching operation includes turning on a switching transistor by applying a gate signal. For example, a power switching operation may include turning on the first switching transistor 208 by applying PWM 1 to the first gate terminal 216. In another example, a power switching operation may include turning on the second switching transistor 210 by applying PWM 2 to the second gate terminal 224.

In some examples, a power switching operation includes turning off a switching transistor by removing a gate signal. For example, a power switching operation may include turning off the first switching transistor 208 by removing PWM 1 from the first gate terminal 216. In another example, a power switching operation may include turning off the second switching transistor 210 by removing PWM 2 from the second gate terminal 224.

The example first capacitor 232 is a two terminal electrical component which stores potential energy in an electric field. The example capacitor includes a first capacitor terminal and a second capacitor terminal, the first capacitor terminal coupled to the first switch node 212 and the second capacitor terminal is coupled to a first inductor terminal of the Lr 234. During high side operation (i.e., the first switching transistor 208 is conducting) potential energy is being stored in the capacitor 232. On the other hand, during low side operation (i.e., the second switching transistor 210 is conducting) potential energy is being discharged through the capacitor 232. The capacitor 232, or the fly capacitor ($C_{fly}$) 232, also stores the fly back current of ($IL_1$) 264 that comes from the magnetic field collapse of an example second inductor $L_1$ 266 of the example second voltage converter circuit 240.

The example first inductor $L_r$ 234 is a two terminal electrical component which stores energy in a magnetic field when current flows through it. The example Lr 234 includes a first inductor terminal and a second inductor terminal, the first inductor terminal coupled to the second capacitor terminal and the second inductor terminal coupled to a third inductor terminal of the second inductor 266. During high side operation (i.e., the first switching transistor 208 is conducting) energy is being stored in Lr 234. On the other hand, during low side operation (i.e., the second switching transistor 210 is conducting) energy is being discharged through Lr 234.

The example third capacitor $C_{out}$ 268 is a two terminal electrical component which stores energy when a voltage is applied to at least one of the terminals. The example third capacitor 268 includes a fifth capacitor terminal and a sixth capacitor terminal, the fifth capacitor terminal is coupled to the fourth inductor terminal of the second inductor 266. During high side operation (i.e., the first and third switching transistors 208, 242 are conducting) potential energy is being stored in the third capacitor 268. On the other hand, during low side operation (i.e., the second and fourth switching transistors 210, 244 are conducting) potential energy is being discharged through the third capacitor 268 to the multi-phase voltage regulator 116.

In an example operation of the first voltage converter circuit 206, when the example first switching transistor 208 is turned on, the current flows through the first drain terminal 214 to the first source terminal 218 and reaches the first switch node 212. The first capacitor $C_{fly}$ 232 charges to half the input voltage of the example power supply 204 that is across the first drain terminal 214. When $C_{fly}$ 232 is charged to a maximum capacity (e.g., the capacitor may be at maximum capacity when the charge across the first capacitor terminal and the second capacitor terminal equal half of the input voltage), the potential energy discharges from $C_{fly}$ 232 to $L_r$ 234 and $C_{out}$ 268, wherein the magnetic field of the first inductor $L_r$ 234 and the second inductor 266 expand, and the third capacitor $C_{out}$ 268 charges, until maximum capacity is met in each component (e.g., the first inductor Lr 234, the second inductor 266, and the third capacitor Cout 268 charge to equal an upper limit of energy determined by a manufacturer). For example, the area of the capacitor (e.g., the size of the capacitor terminals and the distance between them) is proportional to the amount of energy the capacitor can store. When the first switching transistor 208 is turned off, the second switching transistor 210 is turned on. The second switching transistor 210 switches on when the magnetic field of the second inductor 266 collapses and the potential energy is provided to the $C_{fly}$ 232, and when the voltage of the $C_{fly}$ 232 discharges once it reaches maximum capacity, the energy is provided to the second drain terminal 222 of the second switching transistor 210. The current $I_{Cfly}$ 230 conducts from the second drain terminal 222 to the second source terminal 226 to the intermediate node 238. The second capacitor $C_{mid}$ 236 is to charge by receiving the voltage at the intermediate node 238.

The example first voltage converter circuit 206 is coupled to the example second voltage converter circuit 240 to provide an efficient way to convert high input voltage to low output voltage for the multi-phase voltage regulator 116.

FIG. 2 is provided with the example second voltage converter circuit 240 coupled to the example second capacitor $C_{mid}$ 236 via the intermediate node 238. In some examples, the second voltage converter circuit 240 is a single phase synchronous buck converter, wherein the single phase includes two transistors. Additionally or alternatively, the example second voltage converter circuit 240 could be a multi-phase synchronous buck converter, wherein the multi-phase includes a plurality of switching transistors to accommodate for higher current applications. For example, a multi-phase synchronous buck converter is a parallel set of buck power stages, wherein each power stage includes two transistors and an inductor. In the illustrated example, the second voltage converter circuit 240 includes an example third transistor 242, or an example third switching transistor 242 and an example fourth transistor 244, or an example fourth switching transistor 244, coupled at a second switch node 246, an example second inductor $L_1$ 266 coupled to the example third switching transistor 242 and the example fourth switching transistor 244 at the second switch node 246.

In FIG. 2, the third switching transistor 242 and the fourth switching transistor 244 are N-Channel MOSFETs. Alternatively, the third and fourth switching transistors 242, 244 may be P-Channel MOSFETs, PNP BJTs, NPN BJTs, etc. Alternatively, the third switching transistor 242 and the fourth switching transistor 244 may be a switch or any other type of power switching device. In FIG. 2, the third switching transistor 242 includes a third drain terminal 248, a third gate terminal 250, and a third source terminal 252. In FIG. 2, a third diode 254 is a body diode of the third switching transistor 242. In FIG. 2, the third diode 254 is depicted as being coupled to the third drain terminal 248 and the third source terminal 252 to represent the body diode of the third switching transistor 242.

In FIG. 2, the example third switching transistor 242 is an electronic switch which operates (i.e., conducts) when the incoming PWM 3 is high. The third switching transistor 242 can enter a triode operation mode when PWM 3 is applied to the third gate terminal 250 that is greater than source voltage at the third source terminal 252. In the triode operation mode, the third switching transistor 242 acts like a short circuit where current flows from the third drain terminal 248 to the third source terminal 252. The third switching transistor 242 can enter a cut-off operation mode when PWM 3 is removed from the third gate terminal 250 so that the gate voltage at the third gate terminal 250 is less than the source voltage at the third source terminal 252.

In FIG. 2, the fourth switching transistor 244 includes a fourth drain terminal 256, a fourth gate terminal 258, and a fourth source terminal 260. The fourth drain terminal 256 is coupled to the third switching transistor 242 at a second switch node 246 and the fourth source terminal 260 is tied to ground. In FIG. 2, a fourth body diode 262 is a body diode of the fourth switching transistor 244. In FIG. 2, the fourth body diode 262 is depicted as being coupled to the fourth drain terminal 256 and the fourth source terminal 260 to represent the body diode of the fourth switching transistor 244. In operation, the third diode 254 and the fourth body diode 262 operate as suppressor diodes (e.g., flyback diodes, kickback diodes, snubber diodes, etc.). The diodes 254, 262 of FIG. 2 are used to eliminate and/or otherwise suppress flyback, or the sudden voltage spike seen across an inductive load of the controller 202 in between power switching operations of the third and fourth switching transistors 242, 244.

The example fourth switching transistor 244 of FIG. 2 is an electronic switch which operates (i.e., conducts) when PWM 4 is low. The fourth switching transistor 244 can enter a triode operation mode when PWM 4 is applied to the fourth gate terminal 258 that is greater than a source voltage at the fourth source terminal 260. In the triode operation mode, the fourth switching transistor 244 acts like a short circuit where current flows from the fourth drain terminal 256 to the fourth source terminal 260. The fourth switching transistor 244 can enter a cut-off operation mode when PWM 4 is removed from the fourth gate terminal 258 so that the gate voltage at the fourth gate terminal 258 is less than the source voltage at the fourth source terminal 260.

The example second capacitor $C_{mid}$ 236 is a two terminal electrical component which stores potential energy in an electric field. The second capacitor $C_{mid}$ 236 includes a third capacitor terminal and a fourth capacitor terminal, the third capacitor terminal coupled to the intermediate node 238 and the fourth capacitor terminal coupled to ground. During high side operation (i.e., the third switching transistor 242 is conducting) potential energy is being discharged through second capacitor $C_{mid}$ 236. On the other hand, during low side operation (i.e., the fourth switching transistor 244 is conducting) potential energy is being stored by the second capacitor $C_{mid}$ 236.

The example second inductor $L_1$ 266 is a two terminal electrical component which stores energy in a magnetic field when current flows through it. The example second inductor 266 includes a third inductor terminal and a fourth inductor terminal, the third inductor terminal coupled to the second switch node 246 and the fourth inductor terminal coupled to a third capacitor 268. During high side operation (i.e., the third switching transistor 242 is conducting) energy is being stored in the second inductor 266. On the other hand, during low side operation (i.e., the fourth switching transistor 244 is conducting) energy is being discharged through the second inductor 266.

In an example operation of the second voltage converter circuit 240, the operation is similar to a synchronous buck converter. As used herein, a synchronous buck converter is a converter that controls the on/off of the switching transistors in a synchronized order to produce a regulated output voltage lower than its input voltage. The operation begins when PWM 3 is applied to the third gate terminal 250. The PWM 3 turns on the third switching transistor 242 and potential energy of $C_{mid}$ 236 discharges to the third drain terminal 248. The third switching transistor 242 is operating in triode mode, where the current flows from the third drain terminal 248 to the third source terminal 252. The current flows to the second switch node 246 and to the second inductor $L_1$ 266 which generates a magnetic field across the second inductor 266. The current continues to flow to the third capacitor $C_{out}$ 268 which begins storing the potential energy in its two terminals. In some examples, $L_1$ 266 and $C_{out}$ 268 act as an LC filter. As used herein, an LC filter is an electrical storage tank that stores energy oscillating at a circuit's frequency (e.g., the frequency may be determined by the PWM duty cycle).

During the on time of the third switching transistor 242, the fourth switching transistor 244 is off and the LC filter is charging. When PWM 3 is removed from the third switching transistor 242, the third switching transistor 242 turns off and the fourth switching transistor 244 receives a high PWM 4 at the fourth gate terminal 258 and is turned on. When the fourth switching transistor 244 is turned on, the current through the second inductor $L_1$ 266 is discharging due to a change of direction of the potential energy from the discharging of $C_{out}$ 268. The current $IL_1$ 264 is provided to the fourth drain terminal 256.

The fourth switching transistor 244 provides an additional function when both the third switching transistor 242 and the fourth switching transistor 244 are turned off. The fourth switching transistor 244 clamps the switch node voltage (e.g., the voltage at the second switch node 246) via the fourth body diode 262 to prevent the switch node voltage from going too far negative when the third switching transistor 242 is turned off. As used herein, this fixed period of time between the turn off of the third transistor 242 and turn on of the fourth switching transistor 244 is called dead time. Dead time is a short period of time (e.g., 1 nanosecond, 1 millisecond, etc.) and depends on the switching frequency provided by the PWM signal.

In FIG. 2, the first voltage converter circuit 206 operates in connection with the second voltage converter circuit 240 to perform the first example operation. The example controller 202 controls the on/off of the switching transistors 208, 210, 242, and 244 in a synchronized order to produce a regulated output of the input voltage. In the example first operation, the first switching transistor 208 and the third switching transistor 242 are turned on at the same time and the second switching transistor 210 and the fourth switching transistor 244 are turned on at the same time, different than the time of the first and third switching transistors 208, 242. To achieve synchronization between the switching transistors, the example controller 202 produces a specific output for each PWM signal (e.g., control signal). PWM 1 302 and PWM 3 306 have the same rising edge time. PWM 2 304 and PWM 4 308 have the same rising edge time, different than PWM 1 302 and PWM 3 306.

In FIG. 2, the example first operation of the two voltage converter circuits 206, 240 begins when the controller 202 provides a first PWM 1 302 signal to the first gate 216 and a third PWM 3 306 signal to the third gate terminal 250. The first and third switching transistors 208, 242 turn on. The voltage across the first drain 214 to the first source 218 is zero, and current conducts through the first switching transistor 208 to the first switch node 212. The third switching transistor 242 is turned on and the voltage dropped across the third drain 248 and the third source terminal 252 is zero, and current flows through the third switching transistor 242 to the second switch node 246. The output of the current from the first and third switching transistors 208, 242 is represented as the charging current of the inductor L1 266 signal $IL_1$ 264.

When the example second switching transistor 210 and the example fourth switching transistor 244 are turned on, the current IL1 264 of inductor L1 266 is represented as discharging current. The signal $IL_1$ 264 is defined as a ripple current. The inductor ripple current is defined as the peak-to-peak change in current during the on time of a switching transistor. In FIG. 2, the change in inductor $L_1$ 266 current during the first and third switching transistors 208, 242 on time is equal to the change during the first and third switching transistors 208, 242 off time (e.g., the inductor $L_1$ 266 current increase is equal to the inductor $L_1$ 266 current decrease). The current $IL_1$ 264 is determined by the input voltage from the example power supply 204, the duty cycle from the controller 202, and the load (e.g., processing hardware 118 of FIG. 1).

In FIG. 2, the example first operation of the two voltage converter circuits 206, 240 continues when the first and third switching transistors 208, 242 are turned off by the falling edge of the PWM 1 302 signal and the PWM 3 306 signal. As used herein, the falling edge of the PWM signal is the time at which the signal goes from high to low (e.g., 1 volt to 0 volt). There is no longer a big enough voltage between the gate terminals 216 and 250 and the source terminals 219 and 260 to keep the first and third switching transistors 208, 242 on. When the first and third switching transistors 208, 242 are turned off, the third capacitor 268 discharges to a load (e.g., the multi-phase voltage regulator 116 of FIG. 1) and the second inductor $L_1$ 266 discharges causing the current flow to reverse, conducting back through the circuit of FIG. 2 to the second switch node 246 and to the fourth body diode 262. The fourth body diode 262 conducts and the voltage drop across the fourth body diode 262 is approximately zero.

Concurrently, the controller 202 outputs a rising edge of PWM 2 304 signal to the second gate terminal 224 and a rising edge of PWM 4 308 signal to the fourth gate terminal 258. The second and fourth switching transistors 210, 244 are turned on, and the drain current of the second switching transistor 210 conducts from the second drain terminal 222 to the second source terminal 226. The IL1 264 conducts from the fourth drain terminal 256 to the fourth source terminal 260, and then to ground. The drain current from the second switching transistor 210 flows to the intermediate node 238 and to the second capacitor $C_{mid}$ 236. $C_{mid}$ 236 charges until it has reached half of its maximum storage capacity.

In some examples the second and fourth switching transistors 210, 244 can operate to achieve zero voltage switching (ZVS) by using the dead time between a high side power FET (e.g., the first switching transistor 208 and the third switching transistor 242) and a low side power FET (e.g., the second switching transistor 210 and the fourth switching transistor 244). For example, when the third switching transistor 242 is turned off, PWM 4 308 associated with the fourth switching transistor 244 is delayed for a fixed period of time in order to prevent shoot-through. As used herein, shoot-through can occur when both the upper power FET and lower power FET are turned on at the same time. Shoot-through current can conduct or pass from supply or a positive supply rail through both transistors to ground or a negative supply rail and cause damage to one or both switching transistors and/or components proximate to the one or both transistors.

ZVS occurs due to the conducting fourth body diode 262 after the first and third switching transistors 208, 242 are turned off. As mentioned above, the current $IL_1$ 264 conducts to ground when the second switching transistor 210 is turned on. Because of the dead time, the fourth switching transistor 244 has not been turned on yet, so the current flows through the fourth body diode 262, and the diode 262 conducts, acting like a short circuit where zero volts are across it. When PWM 4 308 is applied to the fourth gate terminal 258 the fourth switching transistor 244 turns on, and there are zero volts across the fourth drain terminal 256, therefore, it has achieved zero voltage switching.

In the illustrated example of FIG. 2, the second switching transistor 210 achieves ZVS to operate in a more efficient manner when turning on and off. For example, when the fourth switching transistor 244 is turned on, the voltage at the first capacitor $C_{fly}$ 232 is half of the input voltage and is discharging to the second drain terminal 222. The voltage of $C_{mid}$ 236 is half of the input voltage at the second source terminal 226. The example second body diode 228 receives the current from $C_{fly}$ 232, because it has not been turned on, and conducts. When the PWM 2 304 high signal is applied to the second gate terminal 224, the second switching transistor 210 has been drained to zero volts and turns on, therefore achieving ZVS.

In FIG. 2, the first inductor $L_r$ 234 limits the current spike of the second and fourth switching transistors 210, 244. In other techniques, a resonant inductor in series with a fly capacitor was not included, therefore, the fly capacitor was receiving a current spike during the turning off of the upper power FET, and this current was provided to a drain terminal of the lower power FET, resulting in the need for a high voltage rated device (e.g., a switching transistor may need to be designed to work at 80 volts) in order to avoid damage.

By contrast, in examples disclosed herein, the first inductor $L_r$ 234 limits the current spike of the second and fourth switching transistors 210, 244 by the inductive reactance of the resonant inductor $L_r$ 234. The inductive reactance can be understood as an opposition of a change in current in the inductor due to the inductance. The inductive reactance of $L_r$ 234 can be defined by the switching frequency (e.g., the frequency of the PWM signals) and the inductance (e.g., the size of the inductor, 3 millihenries). For example, when $C_{fly}$ 232 and $L_r$ 234 begin to discharge, $L_r$ 234 opposes the change in current and limits the dramatic spike of negative current the capacitor would have produced.

The example DC to DC converter 112 of FIG. 2 operates in the example second operation when the example controller 202 outputs PWM signals at different times than that of the first example operation. For example, the controller 202 generates a control signal delay based on the rising edge of the PWM 1 302 and PWM 3 306 cycle. When the example PWM generator 270 generates a high signal (e.g., 5 volts, logic 1, etc.) for PWM 3 306 and initiates the example timer 1 272, which applies a fixed time delay (e.g., the fixed time delay 708 of FIG. 7 of 5 nanoseconds) to the PWM 1 302 signal, thus generating a control signal delay. The example timer 1 272 notifies the example PWM generator 270 to generate a high for PWM 1 302 signal when the fixed time delay is complete.

In this manner, the control signal delay pauses the transition of the blocking state to conducting state of the first switching transistor 208. During this pause, the third switching transistor 242 begins to conduct current at the third drain terminal 248. The current of the third drain terminal 248 conducts across the third source terminal 252 and flows to Lr 234, in which the magnetic field of Lr 234 collapses and Icfly 230 reverses, flowing to the first body diode 220. The first body diode 220 conducts and the voltage drop across it is approximately zero. Thus, the voltage drop across the first drain terminal 214 to the first source terminal 218 is also zero volts. The example PWM generator 270 generates a high PWM 1 after the fixed time delay, thus switching the first switching transistor 208 on when there is a voltage drop of zero volts.

In FIG. 2, the example controller 202 generates the synchronous PWM 2 and PWM 4 signals during the example second operation, similar to the example first operation. For example, the PWM generator 270 utilizes timer 2 274 to determine the amount of time PWM 1 and PWM 3 are high. The example PWM generator 270 reduces the PWM 1 and PWM 3 signal when timer 2 274 is complete, and PWM 1 and PWM 3 go low. In response, the example PWM generator 270 generates a high for PWM 2 and PWM 4 simultaneously. The high signal of PWM 2 and PWM 4 are provided to their respective gate terminals to turn on the second switching transistor 210 and the fourth switching transistor 244.

In FIG. 2, the example second operation provides an improvement to the efficiency of the example DC to DC converter 112 of FIG. 1 by achieving ZVS across the first switching transistor 208, the second switching transistor 210, and the fourth switching transistor 244. In some examples, ZVS provides circuit efficiency by reducing switching loss in a transistor that occurs during the time between transition from conducting state to blocking state and vice versa. In some examples, ZVS reduces the EMI by forcing the switching transistors to operate in a minimum or zero voltage state. In other examples, ZVS allows the example first switching transistor 208 to be rated at a lower voltage, in which reduces costs and increases FOM.

The example controller 202 may be implemented by hardware, software, firmware and/or any combination of hardware, software and/or firmware. The example controller 202 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, the example controller 202 is hereby expressly defined to include a non-transitory computer readable storage device or storage disk such as non-volatile memory (e.g., read-only memory (ROM), electrically erasable programmable read-only memory (EEPROM), flash memory, etc.), volatile memory (e.g., Synchronous Dynamic Random Access Memory (SDRAM), Dynamic Random Access Memory (DRAM), etc., and/or any other type of random access memory (RAM) device), etc., including the software and/or firmware. Further still, the example controller 202 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
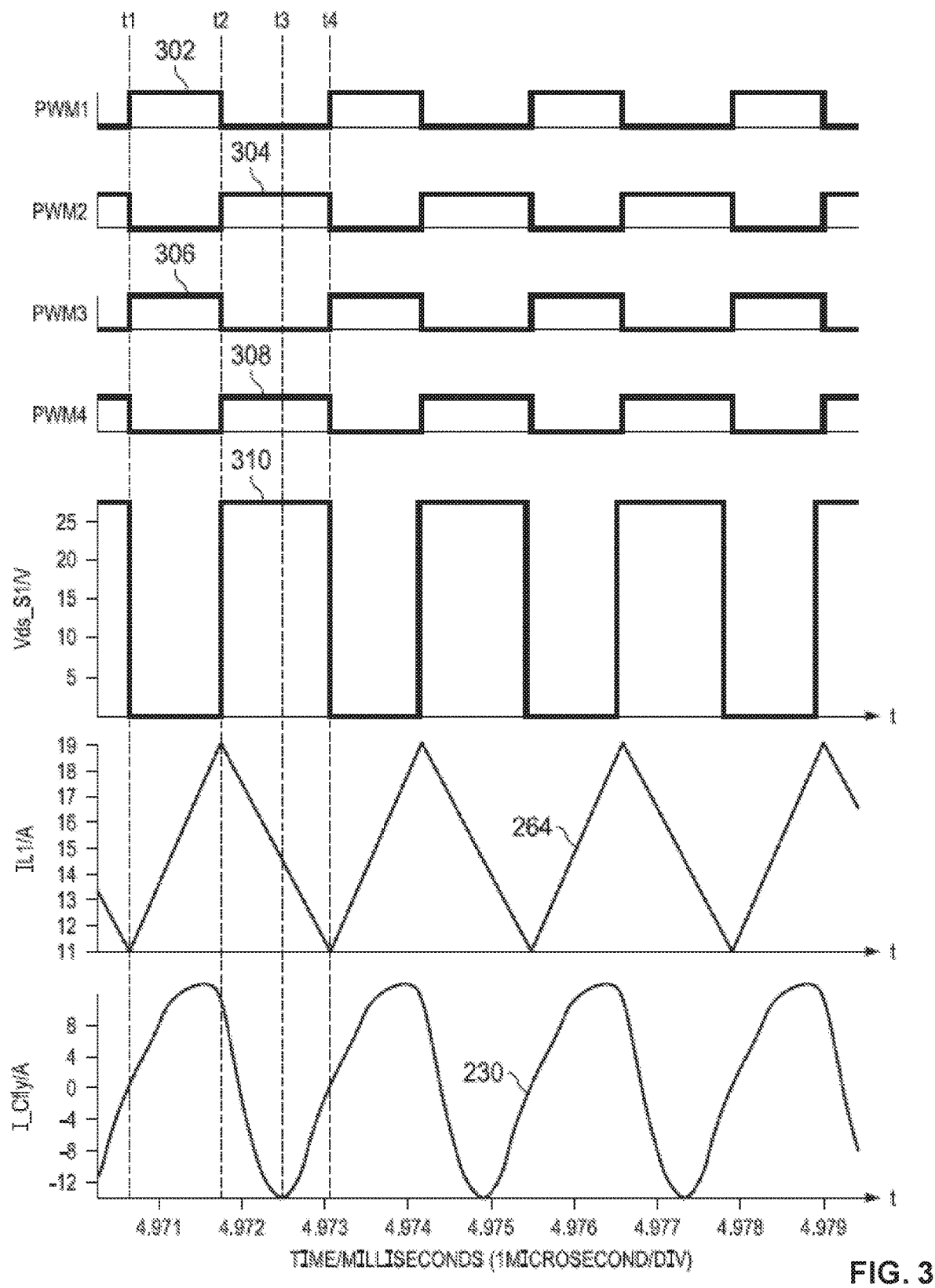
FIG. 3 depicts a timing diagram corresponding to a first operation of the DC to DC converter of FIG. 2.

FIG. 3 depicts an example timing diagram 300 corresponding to an operation of the two voltage converter circuits 206, 240. The example timing diagram depicts the operation of the first and second voltage converter circuits 206 and 240 by displaying the voltage across the first drain 214 to the first source 218 in the signal 310, the current of the second inductor $L_1$ 266 when the first switching transistor 208 is activated, and the current through the first capacitor $C_{fly}$ 232 when the first switching transistor 208 is activated in the signal representing $I_{cfly}$ 230. The signal $IL_1$ 264 may be on the third bus 114 of FIG. 1. The signal $I_{cfly}$ 230 may be on the third bus 114 of FIG. 1.

In FIG. 3, at a first time (t1), the first switching transistor 208 and the third switching transistor 242 of FIG. 2 are activated by applying the PWM 1 302 and PWM 3 306 to the first gate terminal 216 and the third gate terminal 250. For example, (t1) represents the rising edge (e.g., a high signal) of the PWM signal 302 and 306 and the falling edge of the PWM signal 304 and 308. In response to the rising edge of PWM 1 302 and PWM 3 306, the first drain 214 to the first source 218 voltage drops to zero volts as shown by the waveform representing $IL_1$ 264. This is due to the first switching transistor 208 acting as a short circuit and allowing current to flow through the terminals. In the first example response to the current flowing through the terminals 214 and 218, the magnetic field of the second inductor $L_1$ 266 expands, as seen in the second inductor current 264 increasing. The increasing of current begins at time t1 and the current continues to increase until time t2. In a second example response to the current flowing through the terminals 214 and 218, the current $I_{cfly}$ 230 increases at t1 until time t2.

In FIG. 3, the first and third switching transistors 208, 242 are disabled at time t2 which represent the falling edge of the PWM 1 302 and PWM 3 306 signals. For example, the PWM 1 302 provides a low signal to the first gate terminal 216 that is less than the signal provided to the first drain terminal 214, and therefore the first switching transistor 208 is turned off. At time t2, the second and fourth switching transistors 210, 244 are activated. Time t2 represents the rising edge of PWM 2 304 and PWM 4 308, wherein the rising edge signals are provided to the second gate terminal 224 and the fourth gate terminal 258. In the illustrated example, PWM 1 302 and PWM 3 306 are complementary to PWM 2 304 and PWM 4 308. In other examples, the PWM signals could be incompatible, asynchronous, etc. In an example response to time t2, the voltage across the first drain 214 to the first source 218 increases to a voltage that is half of the voltage from the example power supply 204 of FIG. 2.

In FIG. 3, the inductor current $IL_1$ 264 responds to the PWM 2 304 and PWM 4 308 rising edge at time t2 by decreasing, indicating the magnetic field collapsing of the second inductor $L_1$ 266. The second inductor current $IL_1$ 264 continues to decrease until time t4. For example, when the first and third switching transistors 208, 242 turn on at time t4, the second inductor current $IL_1$ 264 will stop decreasing and begin to increase.

In FIG. 3, $I_{city}$ 230 decreases at time t2 when the PWM 2 304 signal and PWM 4 308 signal are at a rising edge, as the first capacitor 232 discharges. $I_{cfly}$ 230 will discharge until time t3, wherein at time t3, $I_{cfly}$ 230 increases. Time t3 does not represent a rising edge or a falling edge of a PWM signal. The capacitor current $I_{cfly}$ 230 increases because of the resonance between $C_{fly}$ 232 and Lr 234. The current $I_{Cfly}$ 230 is equal to Lr 234 current, the moment $I_{cfly}$ 230 begins to increase from the most negative current, represents the energy stored in Lr 234 reaching maximum storage point and the capacitive energy of $C_{fly}$ 232 reaching the minimum storage point. The current $I_{cfly}$ 230 increases due to the resonant inductor Lr discharging. The voltage difference between $C_{fly}$ 232 and $C_{mid}$ 236 determine the voltage on $L_1$ 266, in which $L_1$ 266 voltage determines when $C_{fly}$ 232 and $C_{mid}$ 236 will increase or decrease. The transition point from $C_{fly}$ 232 and $C_{mid}$ 236 increase and decrease is the moment the voltage at $C_{fly}$ 232 equals the voltage at $C_{mid}$ 236. At time t2, $C_{fly}$ 232 voltage is greater than $C_{mid}$ 236 voltage and at time t4, $C_{fly}$ 232 voltage is less than $C_{mid}$ 236 voltage.

In FIG. 3, the second and fourth switching transistors 210, 244 are disabled at a fourth time t4 based on withdrawing the second gate terminal 224 signal and the fourth gate terminal 258 signal. For example, a low signal may be applied to the two gate terminals 224 and 258 via the example controller 202. In response to the second and fourth switching transistors 210, 244 being disabled, the voltage across the first drain terminal 214 and the first source terminal 218 decrease to zero volts because the first switching transistor 208 is activated, and the switch is acting as a short circuit, allowing current to flow through it. In response to the first switching transistor 208 being activated, $IL_1$ 264 is increasing. The repetitive pattern of $IL_1$ 264 increasing and decreasing due to the enabling and disabling the example switching transistors results in a ripple current.

In other timing diagram examples not displayed in FIG. 3, a time delay between the falling edge of PWM 3 306 and the rising edge of PWM 4 308 may be displayed to represent the dead time as described in above in connection with FIG. 2. For example, the falling edge of PWM 3 306 occurs at time 4.974 milliseconds, therefore the rising edge of PWM 4 308 may occur at time 4.9741 milliseconds.

Figure 4B:
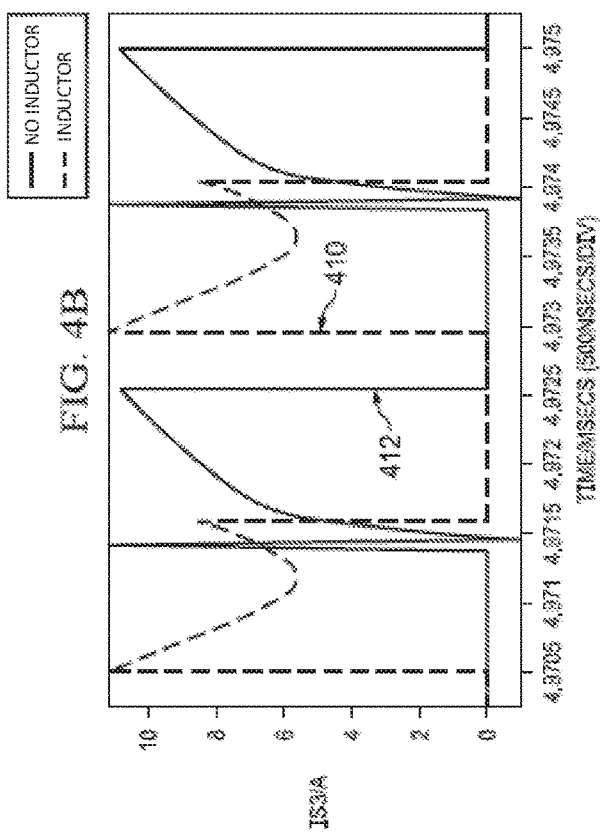
FIGS. 4A, 4B, 4C, and 4D depict timing diagrams corresponding to operation of the example DC to DC converter of FIG. 2.
Figure 4D:
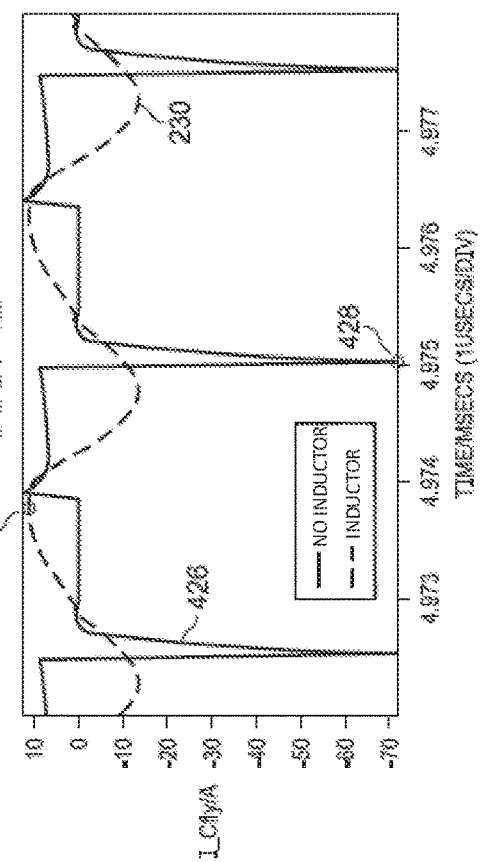
Figure 4A:
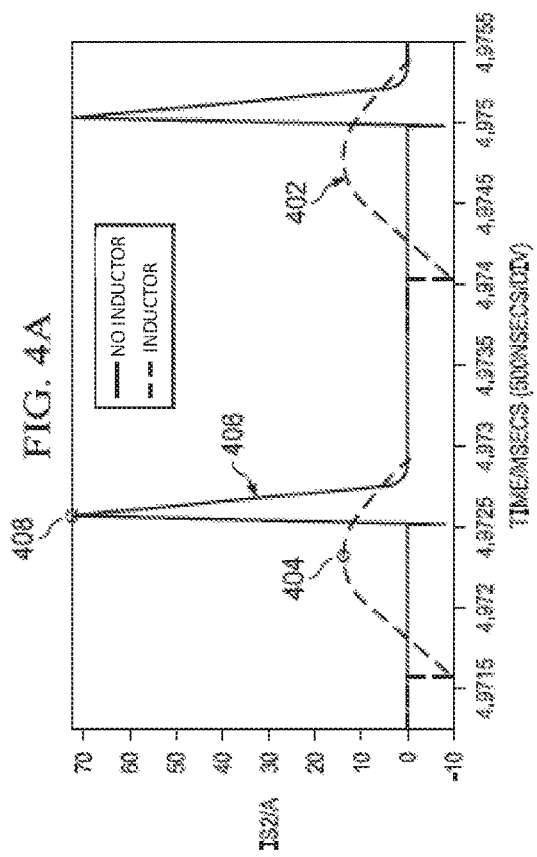

FIG. 4A depicts an example timing diagram displaying the currents of a switching transistor corresponding to its enabling and disabling times. For example, there are two currents being represented, the first current 402 representing the current through the second switching transistor 210 of FIG. 2 and the second current 406 representing a current through a first switching transistor of a schematic excluding the first inductor $L_r$ 234 and having switching transistor at a similar location as the second switching transistor 210. In the illustrated example, the first current 402 through the second switching transistor 210 of FIG. 2 is activated and increases over a time period until it reaches a first peak current 404, the first peak current 404 may be approximately 15 amps. In some examples, the first current 402 decreases after the first peak current 404.

In FIG. 4A, when the first switching transistor without the first inductor Lr 234 is activated, the current 406 conducting through the first switching transistor is at a steady state (e.g., the current remains at zero volts) until a couple of nanoseconds before the first switching transistor is disabled. Before the first switching transistor is disabled, the current 406 spikes to a second peak current 408, the second peak current 408 may be approximately 80 amps.

In FIG. 4A, the timing diagram visually represents an example improvement to the schematic of FIG. 2 to reduce the current spike conducting through the second switching transistor 210. For example, the first peak current 404 corresponding to the current through the second switching transistor 210 of FIG. 2 is less than the second peak current 408 corresponding to the current through the first switching transistor of the schematic excluding the first inductor Lr 234.

FIG. 4B depicts an example timing diagram displaying currents through a switching transistor corresponding to its enabling and disabling times. For example, there are two currents being represented, the third current 410 representing the current conducting through the third switching transistor 242 of FIG. 2 and the fourth current 412 representing a current conducting through a second switching transistor of the schematic excluding the first inductor $L_r$ 234 and having switching transistor at a similar location as the third switching transistor 242. In the illustrated example, the third current 410 through the third switching transistor 242 of FIG. 2 is activated and increases to approximately 15 amps. In the example disclosed herein, the third current 410 decreases from time 4.9705 milliseconds to approximately time 4.9713 milliseconds. The third current 410 increases from approximately time 4.9713 milliseconds to 4.9716 milliseconds, in which the third switching transistor 242 of FIG. 2 is disabled and the third current decreases at time 4.9716 milliseconds.

In FIG. 4B, the second switching transistor of the schematic excluding the first inductor Lr 234 is activated at time 4.9705 milliseconds and the fourth current 412 is at a steady state until 4.9714 milliseconds, wherein the fourth current 412 spikes up through the second switching transistor. The current decreases at approximately 4.97145 milliseconds and then increases at 4.9716 milliseconds, wherein the second switching transistor is disabled. The fourth current 412 continues to increase through the second switching transistor for 1 microsecond (e.g., 4.9716 milliseconds to 4.9726 milliseconds).

Figure 4C:
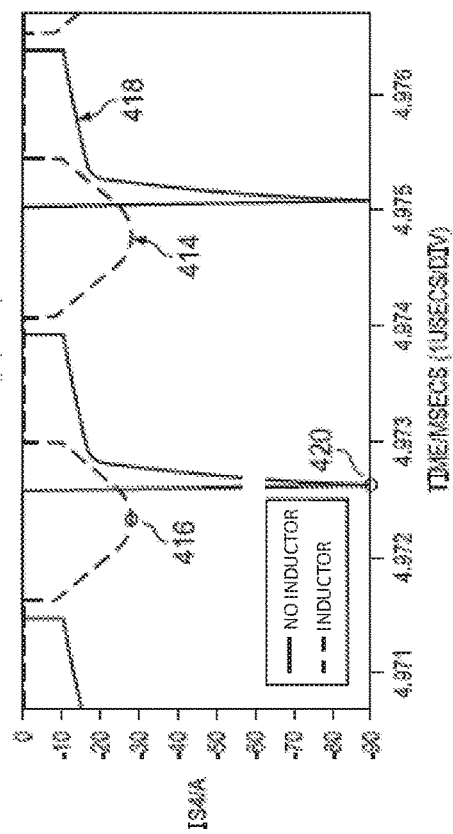

FIG. 4C depicts an example timing diagram representing the currents conducting through a switching transistor corresponding to its enabling and disabling times. For example, there are two currents being represented, a fifth current 414 representing the current through the fourth switching transistor 244 of FIG. 2 and a sixth current 418 representing a current through a third switching transistor of the schematic excluding the first inductor $L_r$ 234 and having switching transistor at a similar location as the fourth switching transistor 244. In the illustrated example, the fourth switching transistor 244 is activated at approximately time 4.9716 milliseconds. In response to the fourth switching transistor 244 being activated, the fifth current 414 through the fourth switching transistor 244 increases to a third peak current 416. In some examples, the third peak current 416 could be approximately 29 amps. Alternatively, the third peak current 416 could be any other value of current less than 70 amps. In the illustrated example, the fifth current 414 decreases at the third peak current 416 time (e.g., 4.9725 milliseconds). The fifth current 414 stops decreasing at time 4.973 milliseconds, wherein 4.973 milliseconds represents the time in which the fourth switching transistor 244 is disabled.

In FIG. 4C, the third switching transistor of the schematic excluding the first inductor Lr 234 is activated at approximately time 4.9716 milliseconds. In response to the switching transistor being activated, the sixth current 418 through the third switching transistor decreases to zero amps. In the illustrated example, the sixth current 418 remains at a steady state for 1 microsecond (e.g., time 4.9715 milliseconds to 4.9725 milliseconds). In the illustrated example, the sixth current 418 increases at time 4.9725 milliseconds to a fourth peak current 420. For example, the fourth peak current 420 may be 80 amps, 89 amps, 80 amps, etc. In the illustrated example, the sixth current 418 decreases from the time of the fourth peak current 420 to the time the third switching transistor is disabled.

In examples of FIGS. 4C and 4D, the values on the y-axis represent amperes with a negative sign in front of them. These values do not teach that a current is negative. The negative sign indicates that the current is flowing in an opposite direction compared to the direction of flowed illustrated in FIGS. 4A and 4B.

FIG. 4D depicts an example timing diagram depicting example currents of a capacitor corresponding to an enabling and disabling time of example switching transistors. For example, there are two currents being represented, $I_{cfly}$ 230 representing the current through the first capacitor $C_{fly}$ 232 of FIG. 2 and a seventh current 424 representing a current through a first fly capacitor of the schematic excluding the first inductor $L_r$ 234 and having the first fly capacitor at a similar location as the first capacitor $C_{fly}$ 232. The current $I_{cfly}$ 230 may be on the third bus 114 of FIG. 1. In the illustrated example, $I_{cfly}$ 230 is responding in the same behavior as described in examples above. In the illustrated example, $I_{cfly}$ 230 increases to a fifth peak current 422, wherein the peak current may represent 10 amps, 15 amps, etc. The example peak current of $I_{cfly}$ 230 represents the maximum amount of current the capacitor 232 receives.

In FIG. 4D, the first fly capacitor of the schematic excluding the first inductor Lr 234 is discharging energy at time 4.9725 milliseconds and the seventh current 424 through the fly capacitor increases, in an opposite direction compared to the initial flow of current, to a sixth peak current 426, wherein the sixth peak current 426 may represent 80 amps, 75 amps, 70 amps, etc. The seventh current 424 through the fly capacitor decreases after the seventh current 424 has reached the sixth peak current 426.

In the illustrated example, the current of $I_{cfly}$ 230 is a smaller peak-to-peak current through the first capacitor $C_{fly}$ 232 compared to the seventh current 424 through the first fly capacitor. This displays reduction in root-mean-square current (RMS), wherein the reduction of RMS current in a capacitor is a reduction of heat and a less likely probability that a capacitor will fail. As used herein, root-mean-square current is the effective value of a varying current, the effective value being the square-root (e.g., a value to the power of 2) of a mean of the amperes in the varying current.

Figure 5:
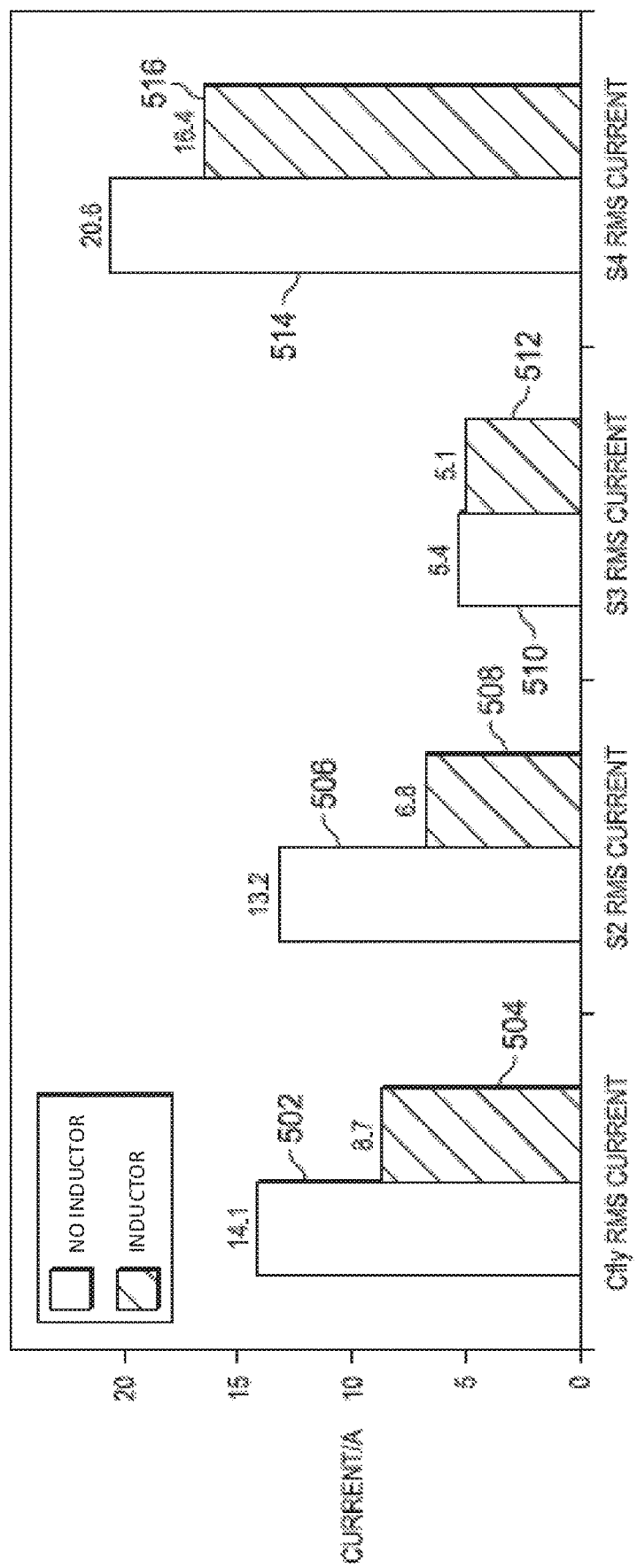
FIG. 5 depicts a graph corresponding to the example DC to DC converter of FIG. 2.

FIG. 5 depicts an example bar graph comparing example RMS currents conducting through the example components discussed in the above paragraphs. For example, FIG. 5 illustrates the RMS current through $C_{fly}$ 232 and the RMS current through the first fly capacitor of the schematic excluding the first inductor Lr 234. For example, the first bar 502 depicts the RMS current through the first fly capacitor, wherein the RMS current through the first fly capacitor is 14.1 amperes. The example second bar 504 depicts the RMS current through $C_{fly}$ 232 at a value of 8.7 amperes. In above examples, it was described in FIG. 4D that the value of RMS current conducting through $C_{fly}$ 232 was lower than the current conducting through the first fly capacitor, therefore, the example bar graph of FIG. 5 depicts this description.

In FIG. 5, an example third bar 506 displays the RMS current conducting through the first switching transistor, wherein the RMS current conducting through the first switching transistor is 13.2 amperes. In the illustrated example, the RMS value of the third bar 506 is compared to the RMS value of a fourth bar 508. For example, the fourth bar 508 depicts the RMS current through the second switching transistor 210 of FIG. 2, wherein the RMS current is a value of 6.8 amperes. This value of 6.8 amperes is lower than the value of 13.2 amperes of the third bar 506. The reduction in RMS current through the second switching transistor 210 provides less heat dissipation and a lower voltage rated switching transistor can be used.

In FIG. 5, an example fifth bar 510 depicts the RMS current through the second switching transistor of the schematic excluding the first inductor Lr 234, wherein the RMS current through the second switching transistor is 5.4 amperes. In the illustrated example, the RMS value of the fifth bar 510 is compared to the RMS value of a sixth bar 512. For example, the sixth bar 512 depicts the RMS current through the third switching transistor 242 of FIG. 2, wherein the RMS current is a value of 5.1 amperes. The RMS value of the current through the third switching transistor 242 is less than the RMS value of the current through the second switching transistor, as displayed in FIG. 5.

In FIG. 5, an example seventh bar 514 depicts the RMS current through the third switching transistor of the schematic excluding the first inductor Lr 234, wherein the RMS current through the third switching transistor is 20.6 amperes. In the illustrated example, the RMS value of the seventh bar 514 is compared to the RMS value of an eighth bar 516. For example, the eighth bar 516 depicts the RMS current through the fourth switching transistor 244 of FIG. 2, wherein the RMS is 16.4 amperes. The RMS value of the current conducting through the fourth switching transistor 244 is less than the RMS value of the current conducting through the third switching transistor, as displayed in FIG. 5. The reduction in RMS current through the fourth switching transistor 244 provides less heat dissipation and a lower voltage rated switching transistor can be implemented.

Figure 6:
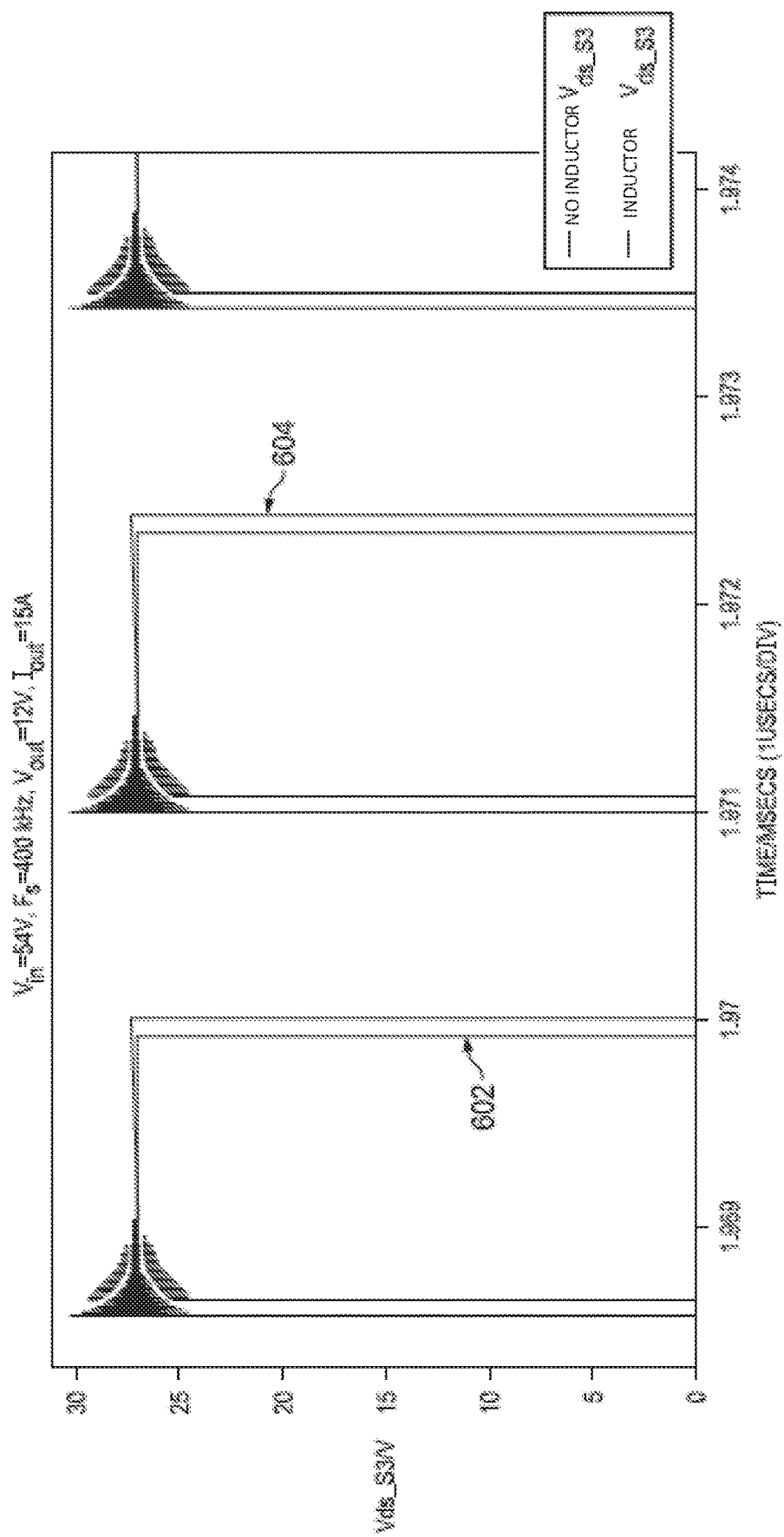
FIG. 6 depicts a timing diagram corresponding to an example switching waveform of the example DC to DC converter of FIG. 2.

FIG. 6 depicts an example timing diagram of a switching waveform of drain voltage across a switching transistor. For example, the switching wave form embodies a peak overshoot voltage that is the voltage across the example third switching transistor 242 of FIG. 2 and the voltage across the second switching transistor of the schematic excluding the first inductor Lr 234. As used herein, peak overshoot voltage is a property of transient time, wherein transient time is a short-lived burst of energy in a system (e.g., a switching transistor) caused by a sudden change of state (e.g. turn on and turn off). For example, the first voltage signal 602 displays a first peak overshoot 604 of the voltage across the second switching transistor drain terminal and source terminal when it is turned on. The voltage value of the first peak overshoot 604 may be 30 volts. The first voltage signal 602 is compared to a second voltage signal 606 which depicts the voltage across the third drain terminal 248 and the third source terminal 252 when the third switching transistor 242 is turned on. For example, the second voltage signal 606 displays a second peak overshoot 608 of the voltage across the third drain terminal 248 and the third source terminal 252 when it is turned on. The voltage value of the second peak overshoot 608 may be 27 volts, which is less than the example value of 30 volts of the first peak overshoot.

In FIG. 6, the example timing diagram illustrates an improvement to the schematic excluding the first inductor Lr 234 by reducing the overshoot of the transient response of the third switching transistor 242. Reducing the overshoot of the transient response is an improvement because the example third switching transistor 242 does not utilize zero voltage switching to help reduce the power loss and electromagnetic interference (EMI). Therefore, the third switching transistor 242 can be rated at a lower voltage, resulting in a high figure of merit (FOM). As used herein, FOM is a numerical expression representing the performance or efficiency of a given device (e.g., switching transistor). The higher the numerical expression of a device, the better efficiency and/or performance.

Figure 7:
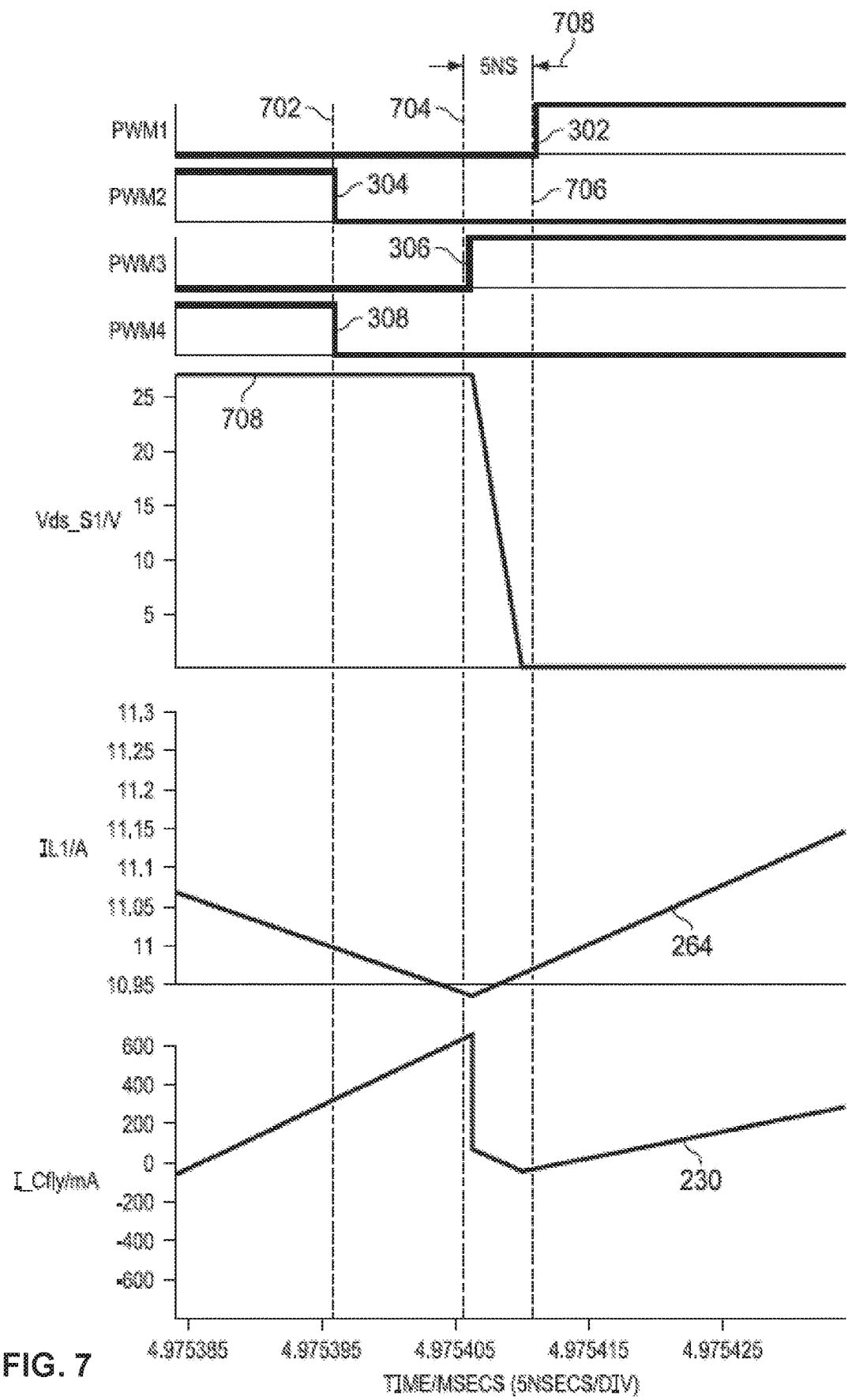
FIG. 7 is an example timing diagram corresponding to a second operation of the example DC to DC converter of FIG. 2.

FIG. 7 depicts a timing diagram illustrating the example second operation of the DC to DC converter 112 of FIG. 2. The timing diagram of FIG. 7 depicts example PWM waveforms, an example first drain to source voltage signal 710 corresponding to the example first switching transistor 208 as a function of time, an example second inductor $L_1$ 266 current signal IL1 264 as a function of time, and an example first capacitor $C_{fly}$ 232 current signal $I_{cfly}$ 230 as a function of time. The signal $IL_1$ 264 shown in FIG. 7 may be on the third bus 114 of FIG. 1.

In FIG. 7, at first time 702, the PWM 2 304 signal and the PWM 4 308 signal are a falling edge and are therefore turning off the second and fourth switching transistors 210, 244 by applying a low signal to the second gate terminal 224 and the fourth gate terminal 258. At the first time 702, there are no changes in the first drain to source voltage signal 710, in the signal $IL_1$ 264 current, or in the signal $I_{cfly}$ 230. In some examples, there is no change in voltage and current displayed in the graphs because at the first time 702, there is a low signal being applied across the switching transistors 208, 210, 242, and 244 and therefore they are turned off.

In the illustrated example of FIG. 7, the time between the first time 702 and a second time 704 is the dead time. The dead time ends at the second time 704, wherein the rising edge of PWM 3 306 signal 306 is applied to the third switching transistor 242 of FIG. 2. For example, the third switching transistor 242 turns on at the second time 704. In response to the example third switching transistor 242 turning on, the first drain to source voltage 710 decreases, the signal $IL_1$ 264 current increases, and the signal $I_{cfly}$ 230 current decreases. The example timer 1 272 applies a fixed time delay 708 to the rising edge of voltage of PWM 1 302 to the first gate terminal 216, the fixed time delay 708 relative to the PWM 3 306 signal 306. For example, the PWM generator 270 determines the rising edge of voltage of PWM 3 306 signal 306 and initiates timer 1 272 to wait 5 nanoseconds to generate a control signal delay to apply to the first gate terminal 216. In response to the fixed time delay 708, the first drain to source voltage 710 decreases to zero volts. In some examples, the timer 1 272 may wait for a time that is different than 5 nanoseconds to achieve ZVS of the first switching transistor 208. For example, to achieve ZVS, the time that timer 1 272 counts may be determined by the output capacitance of the transistor, the circuit inductance (e.g., the circuit layout loop inductance formed by the connecting wires, copper traces, electrical components, etc. of a circuit), etc.

In the illustrated example of FIG. 7, at the third time 706, a rising edge occurs in the PWM 1 302 signal 302. In response to the example rising edge, the signal $I_{cfly}$ 230 increases, thus the first capacitor $C_{fly}$ 232 is charging, indicating that the first switching transistor 208 is turned on and current flows from the first drain terminal 214 to the first source terminal 218 in FIG. 7.

Figure 8:
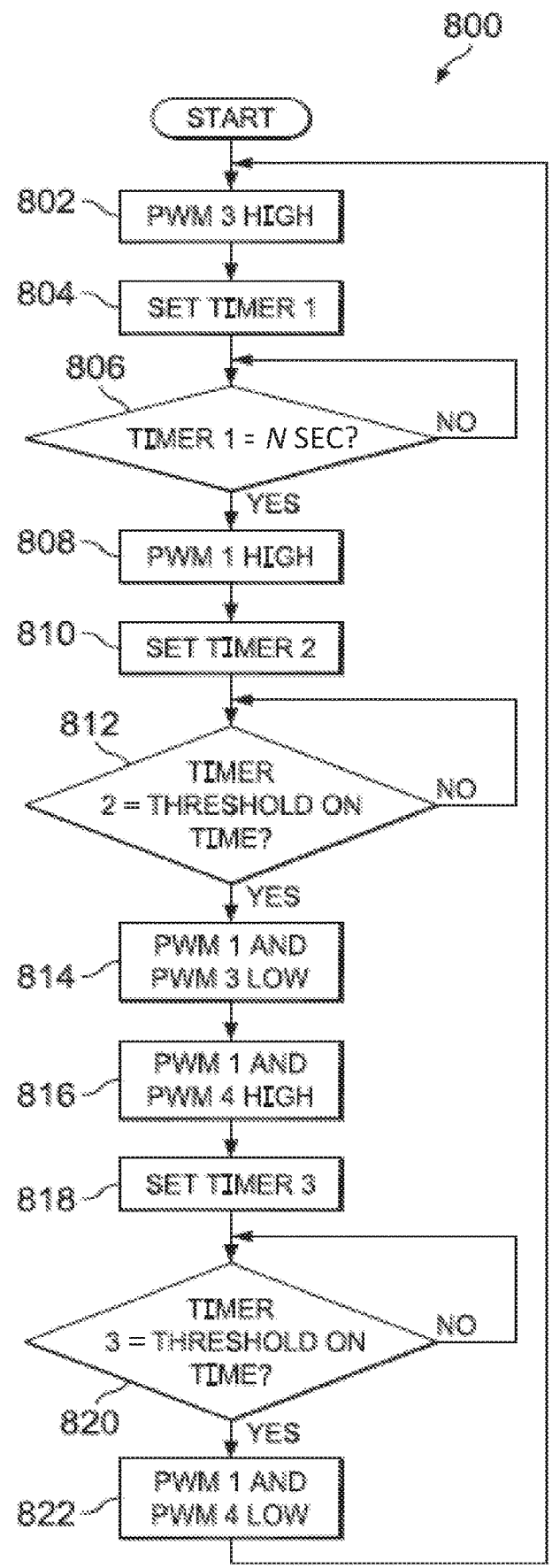
FIG. 8 depicts a flowchart representative of machine readable instructions which may be executed to implement the example controller of FIG. 2.

A flowchart representative of operations performed by example hardware logic, machine readable instructions, and/or any combination thereof for implementing the controller 202 of FIG. 2 is shown in FIG. 8. The machine readable instructions may be one or more executable programs or portion(s) of an executable program for execution by a computer processor. The program may be embodied in software stored on a non-transitory computer readable storage medium such as a Flash, EEPROM, or other embedded memories associated with the processor, but the entire program and/or parts thereof could alternatively be executed by a device other than the processor and/or embodied in firmware or dedicated hardware. Further, although the example program is described with reference to the flowchart illustrated in FIG. 8, many other methods of implementing the example controller 202 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

In some examples disclosed herein, a hardware processor (e.g., the controller 202) may be used to execute the instructions of FIG. 8 to implement the controller 202 of FIG. 2. The hardware processor can be, for example, a microcontroller, a microprocessor, a digital signal processor (DSP), an FPGA, etc. The hardware processor may be a semiconductor based (e.g., silicon based) device. For example, the hardware processor may obtain a measurement (e.g., a current measurement, a voltage measurement, etc.) associated with the third switching transistor 242 of FIG. 2, and/or generate a control signal that is to be obtained by the first switching transistor 208 of FIG. 2. In such examples, the hardware processor can generate a control signal that is to be obtained by the first gate terminal 216 of the first switching transistor 208 of FIG. 2 to turn on or off the first switching transistor 208 to achieve ZVS. For example, the hardware processor may direct and/or otherwise cause the first switching transistor 208 to delay turning on in response to a timer set when PWM 3 is high.

As mentioned above, the example processes of FIG. 8 may be implemented using executable instructions (e.g., computer and/or machine readable instructions) stored on a non-transitory computer and/or machine readable medium such as a hard disk drive, a flash memory, a read-only memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transitory transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 8 is a flowchart representative of machine readable instructions which may be executed to implement the example controller 202 of FIG. 2. The program 800 of FIG.

8 begins at module 802 when the PWM 3 signal 306, generated by the example PWM generator 270, goes high. For example, at the second time 704, the PWM generator 270 generates a rising edge for PWM 3 306 signal. The program 800 then advances to module 804, in which the example PWM generator 270 initiates timer 1 272 after PWM 3 306 signal go high. In some examples, the timer 1 272 is a predetermined time (e.g., 5 ns) that is continuously checked to determine when the predetermined time is complete. For example, when the PWM generator 270 initiates timer 1 272, the timer 1 272 may begin counting up to n seconds from 0 seconds or may begin counting down from n seconds to 0 seconds, wherein n seconds is the fixed delay time and may be 5 nanoseconds, 6 nanoseconds, etc. The example PWM generator 270 determines if timer 1 272 equals n seconds (module 806). If the example PWM generator 270 determines the timer 1 272 does not equal n seconds, the PWM generator 270 continues to wait. If the PWM generator 270 determines timer 1 does equal n seconds, the timer 1 272 stops and notifies the example PWM generator 270 to generate a high PWM 1 302 signal (module 808). For example, the PWM generator 270 generates a rising edge from PWM 1 302 signal.

After the example PWM generator 270 generates a high PWM 1 302 signal, it initiates timer 2 274 (module 810). For example, timer 2 274 is a predetermined time in which is different from the predetermined time of timer 1272. The timer begins counting after timer 2 274 is set (module 810). The PWM generator 270 determines if timer 2 274 equals the threshold on time (module 812) of the PWM 1 302 and PWM 3 306 signals. The threshold on time determines the amount of time the example first and third switching transistors 208, 242 are on. For example, the threshold on time is illustrated by the amount of time the PWM 1 302 and PWM 3 306 signal is high. FIG. 3 illustrates the threshold on time for PWM 1 and PWM 3 between time t4 (4.973 milliseconds) and the time of 4.974 milliseconds, wherein the difference between the two times is 1 microsecond. In this manner, PWM 1 302 and PWM 3 306 are high for 1 microsecond, and therefore 1 microsecond is the example threshold on time for the two PWM signals generated by the example PWM generator 270 of FIG. 2. At module 812, if the example PWM generator 270 determines timer 2 274 does not equal the threshold on time, the timer continues to count. If the PWM generator 270 determines timer 2 274 does equal the threshold on time, the timer stops and the example PWM generator 270 generates a low for PWM 1 302 and PWM 3 306 signal (module 814). For example, the PWM generator 270 applies a falling edge to the PWM 1 and PWM 3 signals.

After the example PWM generator 270 generates a low for PWM 1 and PWM 3 signals (module 814), the example PWM generator 270 generates a HIGH for PWM 2 and PWM 4 signals (module 816). Further, the example PWM generator 270 initiates timer 3 276 (module 818) to count to the threshold on time for the PWM 2 and PWM 4 signals. For example, timer 3 276 is a predetermined time different than the predetermined times of timer 1 272 and timer 2 274. The threshold on time for PWM 2 and PWM 4 signals determine the amount of time in which the second and fourth switching transistors 210, 244 are on. The timer beings counting when timer 3 276 is initiated (module 818). If the PWM generator 270 determines that timer 3 does not equal the threshold on time (module 820), it continues to output a high PWM 2 and PWM 3 signal. If the PWM generator 270 determines that timer 3 276 does equal the threshold on time (module 820), it applies a low to the PWM 2 and PWM 4 signals (module 822). The process returns to module 802 after the example PWM generator 270 drives the PWM 2 and PWM 4 signals low. The example program 800 starts over and control returns to module 802.

From the foregoing, it will be appreciated that example methods, apparatus and articles of manufacture have been disclosed that regulate intermediate bus voltage when stepping down a high voltage input to increase efficiency across a load. The disclosed methods, apparatus, and articles of manufacture also reduce power loss that occurs across switching transistors when receiving high voltage drain inputs, therefore developing a high FOM for each switching device disclosed. The disclosed methods, apparatus and articles of manufacture improve the efficiency of using a computing device by optimizing intermediate bus voltage to intentionally provide optimal power to one or more computing devices from the same power source. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising,
a first converter circuit comprising:
a first transistor coupled between an input terminal and a first switching terminal, and having a first gate;
a second transistor coupled between the first switching terminal and a converter connection terminal, and having a second gate;
a capacitor having first and second capacitor terminals, wherein the first capacitor terminal is directly connected to the first switching terminal; and
a first inductor having first and second inductor terminals, the first inductor terminal is directly connected to the second capacitor terminal; and
a second converter circuit comprising:
a third transistor coupled between the converter connection terminal and a second switching terminal, and having a third gate;
a fourth transistor coupled between the second switching terminal and a ground terminal, and having a fourth gate; and
a second inductor having third and fourth inductor terminals, wherein the third inductor terminal is directly connected to the second inductor terminal and the second switch terminal, and the fourth inductor terminal is coupled to an output terminal.

2. The apparatus of claim 1, further comprising a controller having first, second, third and fourth controller outputs, wherein the first controller output is coupled to the first gate, the second controller output is coupled to the second gate, the third controller output is coupled to the third gate, and the fourth controller output is coupled to the fourth gate.

3. The apparatus of claim 1, wherein the capacitor is a first capacitor, the apparatus further comprising:
a second capacitor coupled between the converter connection terminal and the ground terminal; and
a third capacitor coupled between the output terminal and the ground terminal.

4. The apparatus of claim 1, wherein the output terminal is coupled to a load.

5. An apparatus comprising:
a first converter circuit including:
  a first transistor having first and second current terminals and a first control terminal; and
  a second transistor having third and fourth current terminals and a second control terminal, wherein the third current terminal is coupled to the second current terminal;
  a capacitor having first and second capacitor terminals, wherein the first capacitor terminal is coupled to the second current terminal; and
  a first inductor having first and second inductor terminals, wherein the first inductor terminal is directly connected to the second capacitor terminal;
a second converter circuit including:
  a third transistor having fifth and sixth current terminals and a third control terminal, wherein the fifth current terminal is coupled to the fourth current terminal;
  a fourth transistor having seventh and eighth current terminals and a fourth control terminal, wherein the seventh current terminal is coupled to the sixth current terminal; and
  a second inductor having third and fourth inductor terminals, wherein the third inductor terminal is directly connected to the second inductor terminal, and the fourth inductor terminal is coupled to an output terminal; and
a controller configured to:
  transmit a first signal to the first control terminal;
  transmit a second signal to the first control terminal a first delay after transmitting the first signal;
  transmit a third signal to the third control terminal a second delay after transmitting the first signal, wherein the second delay is less than the first delay; and
  transmit a fourth signal to the fourth control terminal the first delay after transmitting the first signal.

6. The apparatus of claim 5, wherein the third transistor and the fourth transistor achieve zero-voltage switching.

7. The apparatus of claim 5, wherein the fourth inductor terminal is coupled to a load via a bus.

8. The apparatus of claim 5, wherein the second converter circuit is a single phase synchronous buck converter circuit or a multiphase synchronous buck converter circuit.

9. A system, comprising:
a converter circuit having an input terminal and an output terminal, wherein the converter circuit comprises:
  a first converter including:
    a first transistor having first and second current terminals and a first control terminal, wherein the first current terminal is coupled to the input terminal; and
    a second transistor having third and fourth current terminals and a second control terminal, wherein the third current terminal is coupled to the second current terminal;
    a capacitor having first and second capacitor terminals, wherein the first capacitor terminal is coupled to the second current terminal; and
    a first inductor having first and second inductor terminals, wherein the first inductor terminal is directly connected to the second capacitor terminal;
  a second converter comprising:
    a third transistor having fifth and sixth current terminals and a third control terminal, wherein the fifth current terminal is coupled to the fourth current terminal, and the sixth current terminal is coupled to the output terminal; and
    a fourth transistor having a seventh current terminal, an eighth current terminal, and a fourth control terminal, wherein the seventh current terminal is coupled to the sixth current terminal and to the output terminal;
    a second inductor having third and fourth inductor terminals, wherein the third inductor terminal is directly connected to the second inductor terminal, and the fourth inductor terminal is coupled to the output terminal; and
  a controller configured to:
    transmit a first signal to the first control terminal;
    transmit a second signal to the second control terminal a first delay after transmitting the first signal;
    transmit a third signal to the third control terminal a second delay after transmitting the first signal, wherein the second delay is less than the first delay; and
    transmit a fourth signal to the fourth control terminal the first delay after transmitting the first signal; and
a voltage regulator circuit coupled to the output terminal, wherein the voltage regulator circuit is configured to produce a regulated voltage responsive to a voltage at the output terminal.

10. The system of claim 9, wherein the converter circuit is a direct current to direct current (DC-DC) converter, and the voltage regulator circuit is a multiphase voltage regulator circuit.

11. The system of claim 9, wherein a back-up battery is configured to provide an input voltage to the input terminal responsive to a connection to a power supply being lost.

12. The system of claim 9, further comprising processor hardware configured to receive the regulated voltage.

13. The system of claim 9, wherein the third transistor and the fourth transistor achieve zero-voltage switching.

14. The system of claim 13, wherein the zero-voltage switching reduces power conduction losses in the converter circuit.

15. The system of claim 12, wherein the voltage regulator circuit is coupled to the processing hardware via a second output terminal, wherein the second output terminal provides the regulated voltage.

* * * * *